April 27, 1965 P. WARGO 3,181,064
WIDE SCALE ELECTRICAL MEASURING INSTRUMENT WITH TWO APERTURED
POLE PIECES LYING IN SUBSTANTIALLY PARALLEL PLANES
AND A MOVABLE COIL SURROUNDING ONE POLE PIECE
Filed Jan. 28, 1963 2 Sheets-Sheet 1

INVENTOR
Peter Wargo

By William J. Newman
Attorney

April 27, 1965

P. WARGO 3,181,064

WIDE SCALE ELECTRICAL MEASURING INSTRUMENT WITH TWO APERTURED
POLE PIECES LYING IN SUBSTANTIALLY PARALLEL PLANES
AND A MOVABLE COIL SURROUNDING ONE POLE PIECE

Filed Jan. 28, 1963

INVENTOR
Peter Wargo

By William J. Newman
Attorney

United States Patent Office 3,181,064
Patented Apr. 27, 1965

3,181,064
WIDE SCALE ELECTRICAL MEASURING INSTRUMENT WITH TWO APERTURED POLE PIECES LYING IN SUBSTANTIALLY PARALLEL PLANES AND A MOVABLE COIL SURROUNDING ONE POLE PIECE
Peter Wargo, Maywood, Ill., assignor to Stewart-Warner Corporation, Chicago, Ill., a corporation of Virginia
Filed Jan. 28, 1963, Ser. No. 254,070
4 Claims. (Cl. 324—150)

This application relates generally to electrical measuring instruments. More particularly, the invention relates to low cost instruments of the wide scale type, and is an improvement over the device disclosed in U.S. Patent No. 3,005,951 issued to Adolph E. Gersch, October 24, 1961.

Although the present invention has been found to be particularly adaptable for use in an electric speedometer or a tachometer, it will be apparent from the following discussion that the invention herein can advantageously be utilized in instruments and meters used for other purposes. Therefore, it is to be understood that, although the description herein will cover the application to the speed indicating art, the invention is not to be limited thereby.

The meter in the Gersch patent represents the first successful attempt to develop a wide scale instrument which could be produced at relatively low cost. Mr. Gersch found that a substantially linear instrument could be provided with a bar magnet having a flat pole piece attached to one pole and an annular pole piece of substantial mass magnetically coupled to the other pole with a coil mounted for pivotal movement against a biasing force about the axis of the annular pole piece along a substantial portion of its periphery. The magnetic flux field density between the annular pole piece and the other pole piece was sufficiently constant along the periphery of the annular pole piece to provide a linear driving force for the coil when a current was passed therethrough.

Further development of the meter by the author of the present invention resulted in improvements which not only enhanced the meter's operation but also made it a more commercially attractive device. The Gersch meter is a rather bulky instrument especially when combined with an odometer which would occupy substantial space behind the vehicle instrument panel.

The distance between the two pole pieces in the Gersch meter is necessarily quite substantial to insure a uniform magnetic flux field therebetween. If the odometer is positioned below the meter movement as shown in the Gersch patent, a large diameter housing is required to package the instrument. If the odometer is positioned in back of the meter movement a long housing is required. It is, therefore, an object of this invention to provide a wide scale electric meter movement which is substantially shorter and more compact than the basic meter of the Gersch patent.

It is also an object of this invention to provide a wide scale electric meter with improved linearity. Meters of this type are often housed in steel casing to prevent damage as well as the infiltration of foreign matter to the meter movement. It was found, however, that the steel casing had a deleterious effect on the linearity of the meter because the iron contained therein distorted the magnetic field between the pole pieces.

In the meter of the present invention the effects of the casing are materially reduced by the use of a new design pole piece in place of the flat pole piece of the Gersch meter, said pole piece having a circular aperture therein which is eccentric about an axis coextensive with the annular pole piece so that the edge forming the aperture is closer than the outer edge to the annular pole piece. Thus, the major portion of the magnetic field for driving the coil extends between the annular pole piece and the edge defining the aperture in the other pole piece.

The new shaped pole piece improves the linearity of the meter to such an extent it is possible to shorten the air gap between the two pole pieces by reducing the length of the magnet. A greater sensitivity is, therefore, achieved because of the more efficient magnetic circuit. Hence, it is another object to provide a wide scale electric meter which has a much greater sensitivity than previous meters of this type.

Another object of this invention is to provide a high efficiency magnetic circuit for use in a wide scale electric meter.

A further object of this invention is to provide a low cost wide scale electric meter movement.

Other objects and advantages of this invention will become apparent upon a further reading of the specification especially when taken in view of the accompanying drawings in which.

Figure 1:
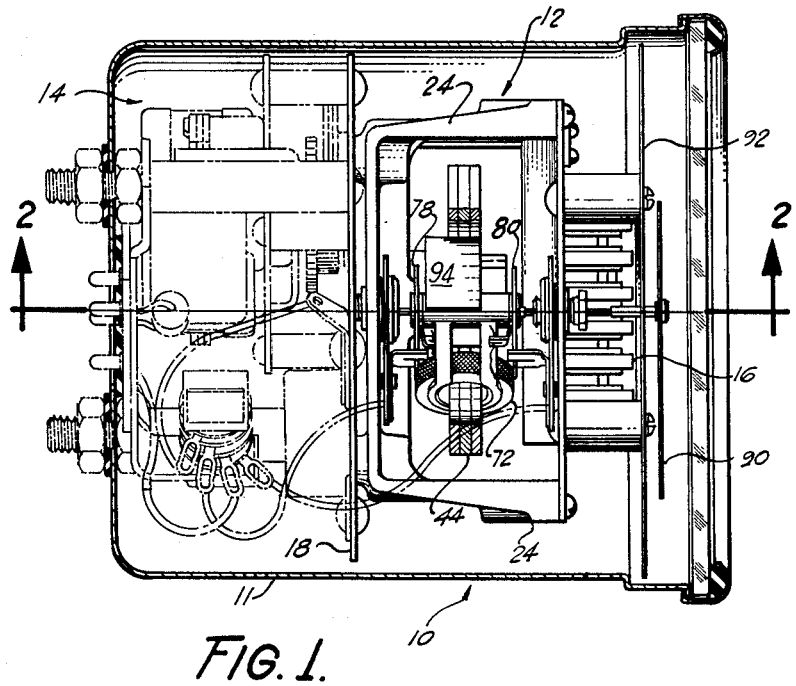
FIG. 1 is a plan view of a meter embodying the teachings of this invention with an odometer drive assembly shown in phantom to portray a complete assembly as would be used as a speed and mileage indicator in a vehicle.

Referring first to FIG. 1 there is shown a combined speed and mileage indicating instrument 10 within a housing 11 comprising a meter movement assembly 12 for indicating speed and an odometer drive assembly 14 for actuating the indicator dials of an odometer 16. The odometer drive assembly 14 is supported on a plate 18 which also forms an integral part of the meter movement assembly 12 as described hereinafter. The odometer drive mechanism is described fully in my copending application, Serial No. 240,861 filed November 29, 1962, (Wargo Case 12).

Figure 2:
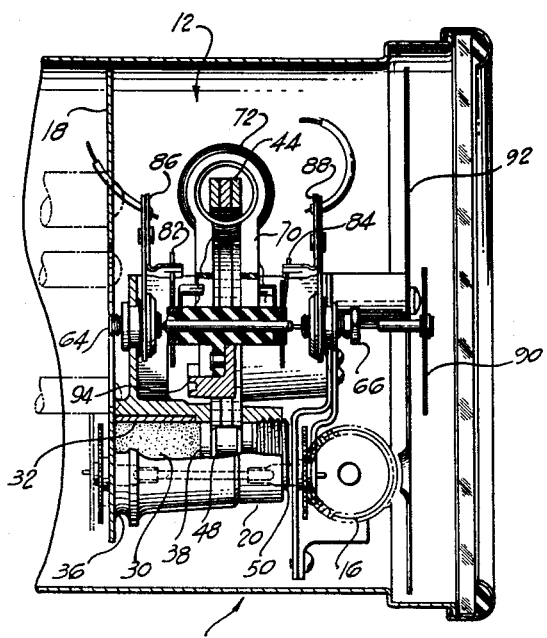
FIG. 2 is a section view taken along the line 2—2 of FIG. 1 showing the assembled components making up the meter movement.
Figure 3:
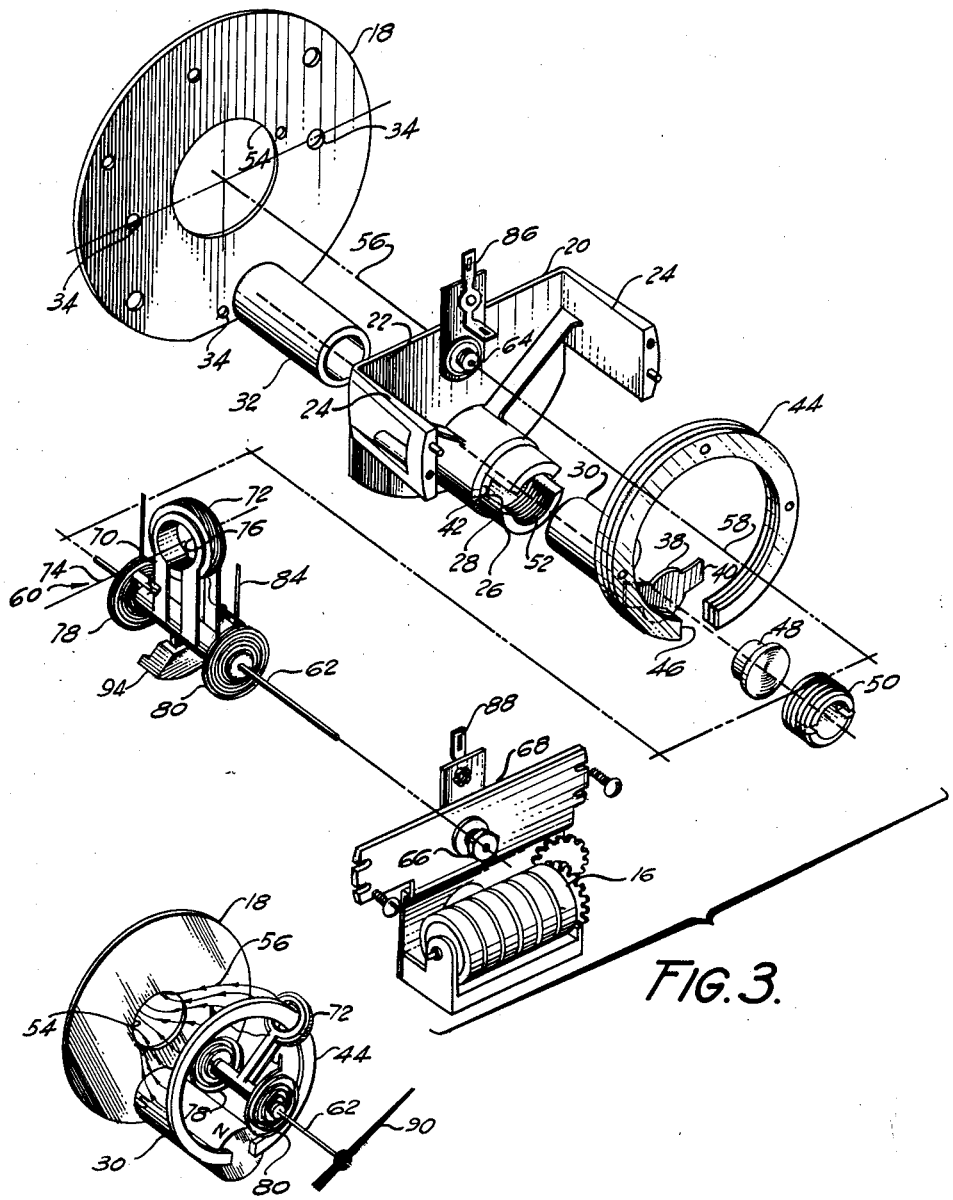
FIG. 3 is an exploded perspective of the components making up the electrical meter movement.

Describing in detail the meter movement assembly, reference is made especially to FIGS. 2 and 3. The assembly 12 comprises a frame 20 having a base portion 22 with two outstanding flanges 24 and a circular cylindrical protrusion 26 extending from the base portion 22. The protrusion 26 has a bore 28 therethrough extending through the base portion 22 for receiving a magnet 30 and compensator sleeve 32.

The frame 20 is cast of aluminum so as not to disturb the magnetic flux field created by the magnet 30. The compensator sleeve 32 which closely surrounds the magnet 30 within the bore 28 is formed of a nickel alloy, its purpose being to compensate for temperature responsive variations in the magnetic strength of the magnet 30. The permeability of the alloy forming the sleeve 32 has a negative temperature coefficient to counteract the negative temperature coefficient of magnet strength.

The plate 18 which forms the support for the odometer drive mechanism 14 is joined to the frame 20 by means of bolts (not shown) passing through apertures 34 and threaded into tapped holes (not shown) in the base portion of the frame 20. As shown in FIG. 2 the plate 18 abuts the frame 20 about a hub 36 surrounding the bore 28 so that one end of the magnet 30 directly engages the plate. The plate 18 is formed of steel and serves as a pole piece for defining the magnetic flux path emanating from the magnet 30.

Abutting the other end of the magnet 30 is a spacer tab 38 having wings 40 which fit within slots 42 in the protrusion 26 of the frame 20. A laminated iron ring 44 abuts the spacer tab 38 along the wing portions 40 and also fits within the slots 42 in the protrusion 26. The ring 44 has a gap 46 to permit a flanged button 48 to extend therethrough and engage the spacer tab 38.

The magnet 30, spacer tab 38, laminated ring 44 and button 48 are held in tight serial engagement with the opposite end of the magnet 30 in engagement with the plate 18 by means of a threaded plug 50 which interacts with the internal threads 52 in the end of the protrusion 26.

The spacer tab 38 and the button 48 are formed of iron containing materials so that the laminated ring 44 is, in effect, magnetically coupled to the other end of the magnet 30 to form a pole piece for defining the magnetic flux path thereat.

Figure 4:
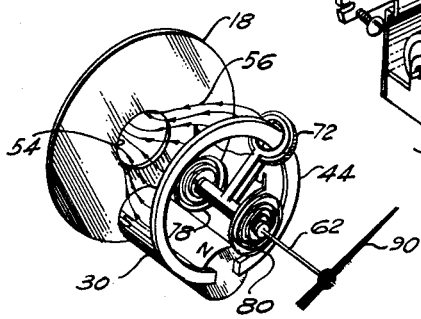
FIG. 4 is a simplified perspective showing the relationship of the major components of the meter.

The above described completes the magnetic circuit assembly for providing the magnetic field to drive the movable element to be hereinafter described. The two pole pieces, plate 18 and laminated ring 44 being magnetically coupled to the pole ends of the magnet 30 serve to define the flux path through the air gap between the two elements. The plate 18 has a circular aperture 54 which is concentric about an axis 56 coextensive with the axis 58 of the circular laminated ring 44 forming the other pole piece. The diameter of the outer periphery of plate 18 is quite substantial with respect to the diameter of the aperture 54 so that the edge forming the aperture 54 is closer to the ring 44 than the outer edge forming the periphery of the plate 18. Thus, the flux field between the plate 18 and the ring pole piece 44 is patterned substantially as represented by the arrowed lines 56 in the simplified FIG. 4. The major portion of the flux emanating from the ring 44 terminates at the edge forming the aperture 54 because of its inherent nature to seek an edge and because that edge is closer to the ring 44. With the aperture 54 of the pole piece 18 and the annular pole piece 44 being concentric about the coextensive axes, the flux field in the air gap therebetween tends to be much more linear than that produced in the meter of the Gersch patent hereinbefore described. The housing 11 fitting around the periphery of plate 18 has little if any effect on the magnetic field between the ring 44 and the edge forming the aperture 54 in the plate 18.

The improved linearity of the magnetic field permits the two pole pieces 18 and 44 to be placed closer together without seriously impairing the linearity. This, of course, materially reduces the length of the instrument which is an important consideration in the design of a commercial device.

More important, however, is the fact that the reduced distance between the pole pieces 18 and 44 improves the sensitivity of the instrument. The magnetic circuit formed by the pole pieces, magnet 30, spacer tab 38 and button 48 is more efficient thereby producing a stronger magnetic field in the air gap between the two pole pieces.

Continuing now with the description of the movement, reference is again made to FIG. 3. A moving coil assembly 60 is adapted to interact with the flux field 56 and rotate about an axis formed by shaft 62. The shaft 62 is journaled at one end in a bearing 64 mounted in the base 22 of the frame 20 and at the other end in a bearing 66 mounted in a bracket 68 extending across the ends of the frame flanges 24. The bearings 64 and 66 are positioned so that the shaft 62 is coextensive with the axes 56 and 58 of the pole pieces 18 and 44.

Shaft 62 carries a plastic form 70 for mounting a coil 72 about a portion of the form defining an aperture 76. The laminated ring 44 passes through the aperture and thus lies along the axis 74 of the coil 72. Thus the coil 72 is free to rotate about the axis 58 along a substantial portion of the annular pole piece 44. Spiral springs 78 and 80 provide bias force for maintaining the assembly 60 in an at rest position when the coil is not energized. The springs have their inner ends secured to the plastic support 70 and their outer ends 82 and 84 secured to terminals 86 and 88, respectively, which are mounted on the frame 20 and bracket 68, respectively. The coil 72 is electrically connected to the springs 78 and 80, which are formed with electrically conductive material. Electric source current supplied to the terminals 86, 88, will therefore be conducted through the springs 78, 80, and applied to the coil 72. The energizing current in the coil 72 causes the assembly 60 to rotate about shaft 62 through an angular displacement proportional to the current. Since the field emanating from the annular pole piece 44 is substantially linear there is direct relation between the angular deflection of the assembly 60 and the current passing therethrough.

The shaft 62 carries a pointer 90 at its end which extends beyond the bearing 66 and visually cooperates with indicia on a dial face 92 (FIG. 2) to indicate the angle of rotation. In the present embodiment with the current in coils 72 being representative of vehicle speed the indicia on the face dial is calibrated in miles per hour. It is to be understood, however, that the meter movement may be used for any type of electrical measurements and the dial face calibrated accordingly.

The moving coil assembly 60 also carries a counterweight 94 to offset the unbalance created by the weight of the other components of the assembly. Therefore, no torque is lost in overcoming gravitational effects on the assembly.

While there has been disclosed one embodiment of a meter movement embodying the teachings of this invention, there are many modifications and additions which may be made thereto without deviating from the principles taught herein. It is, therefore, intended that the invention be limited only by the scope of the appended claims.

What is claimed is:

1. A substantially uniform wide scale electric meter movement comprising a substantially straight bar magnet, an annular pole piece magnetically coupled to one pole of said magnet and lying within a plane perpendicular to the direction of polarization of the magnet at said one pole, a second pole piece magnetically coupled to the other pole of said magnet and lying substantially within a plane parallel to and spaced from said annular pole piece a distance at least as great as the length of said bar magnet, said second pole piece having an inner edge and an outer edge, said inner edge defining a circular aperture about an axis coextensive with the axis of said annular pole piece, each point around said inner edge being closer than the radially corresponding point on said outer edge to all radially corresponding points on said annular pole piece whereby flux emanating from said first pole piece tends to terminate at said inner edge to substantially confine the flux field within the outer edge of said second pole piece, a coil surrounding said annular pole piece, means mounting said coil for rotation about said coextensive axes, and means for biasing the movement of said coil.

2. A substantially uniform, wide-scale, electric meter movement comprising a magnet, an annular pole piece magnetically coupled to one pole of said magnet, a second pole piece magnetically coupled to the other pole of said magnet and lying substantially within a plane parallel to said annuar pole piece to define a flux gap therewith substantially greater in length than the axial thickness of said annular pole piece, said second pole piece having an inner edge and an outer edge, said inner edge defining a circular aperture about an axis coextensive with the axis of said annular pole piece, each point around said inner edge being closer than the radially corresponding point on said outer edge to all radially corresponding points on said annular pole piece whereby flux emanating from said first pole piece tends to terminate at said inner edge to substantially confine the flux field within the outer edge of said second pole piece, a coil surrounding said annular pole piece, means mounting said coil for rotation about said coextensive axes, and means for biasing the movement of said coil.

3. A substantially uniform, wide-scale electric instrument comprising a straight permanent bar magnet; a coil; a generally annular pole piece having an opening to permit threading of the pole piece through said coil; the pole piece having a substantially uniform cross-section and being substantial in mass relative to the magnet; magnetic structure engaging one pole of said magnet and said pole piece providing a low reluctance magnetic circuit therebetween and closing said pole piece opening; mounting means rigidly securing said pole piece, magnetic structure and magnet rigidly together with said pole piece disposed about an axis parallel and noncoaxial with the axis of said magnet; means including a shaft coaxial with the axis of said annular pole piece pivotally supporting said coil for rotational movement along the circumferential length of said pole piece; at least one biasing spring secured rigidly to said shaft; means secured to the free ends of said spring preventing movement thereof; a stationary scale; a pointer rigidly secured to said shaft and cooperating with said scale to provide instrument readings; a second pole piece rigidly secured to the other pole of said magnet in a plane parallel to and spaced from said annular pole piece a distance at least as great as the length of said magnet, said second pole piece having an inner and an outer edge, said inner edge defining a circular aperture every point of which is closer than the radially corresponding point on said outer edge to all radially corresponding points on said annular pole piece whereby flux emanating from said first pole piece tends to terminate at said inner edge to substantially confine the flux field within the outer edge of said second pole piece.

4. A substantially uniform, wide scale electric instrument comprising a permanent magnet; a coil; a generally annular pole piece having a substantially uniform cross-section and being substantial in mass relative to the magnet; means rigidly securing and magnetically coupling said pole piece to said magnet with said pole piece disposed about an axis parallel and noncoaxial with the axis of said magnet; means including a shaft coaxial with the axis of said annular pole piece pivotally supporting said coil for rotational movement along the circumferential length of said pole piece; at least one biasing spring secured rigidly to said shaft; means secured to the free ends of said spring preventing movement thereof; a stationary scale; a pointer rigidly secured to said shaft and cooperating with said scale to provide instrument readings; a second pole piece rigidly secured to the other pole of said magnet in a plane parallel with said annular pole piece to define a flux gap substantially greater in length than the axial thickness of said annular pole piece, said second pole piece having an inner and an outer edge, said inner edge defining a circular aperture every point of which is closer than the radially corresponding point on said outer edge to all radially corresponding points on said annular pole piece whereby flux emanating from said first pole piece tends to terminate at said inner edge to substantially confine the flux field within the outer edge of said second pole piece.

References Cited by the Examiner
UNITED STATES PATENTS 1,125,711 1/15 Record _____ 324—150
3,005,951 10/61 Gersch _____ 324—150

WALTER L. CARLSON, *Primary Examiner.*
RUDOLPH V. ROLINEC, *Examiner.*